Jan. 16, 1968  C. L. JOHNSON  3,363,414
GAS TURBINE ENGINE FUEL SYSTEM
Filed Jan. 22, 1965
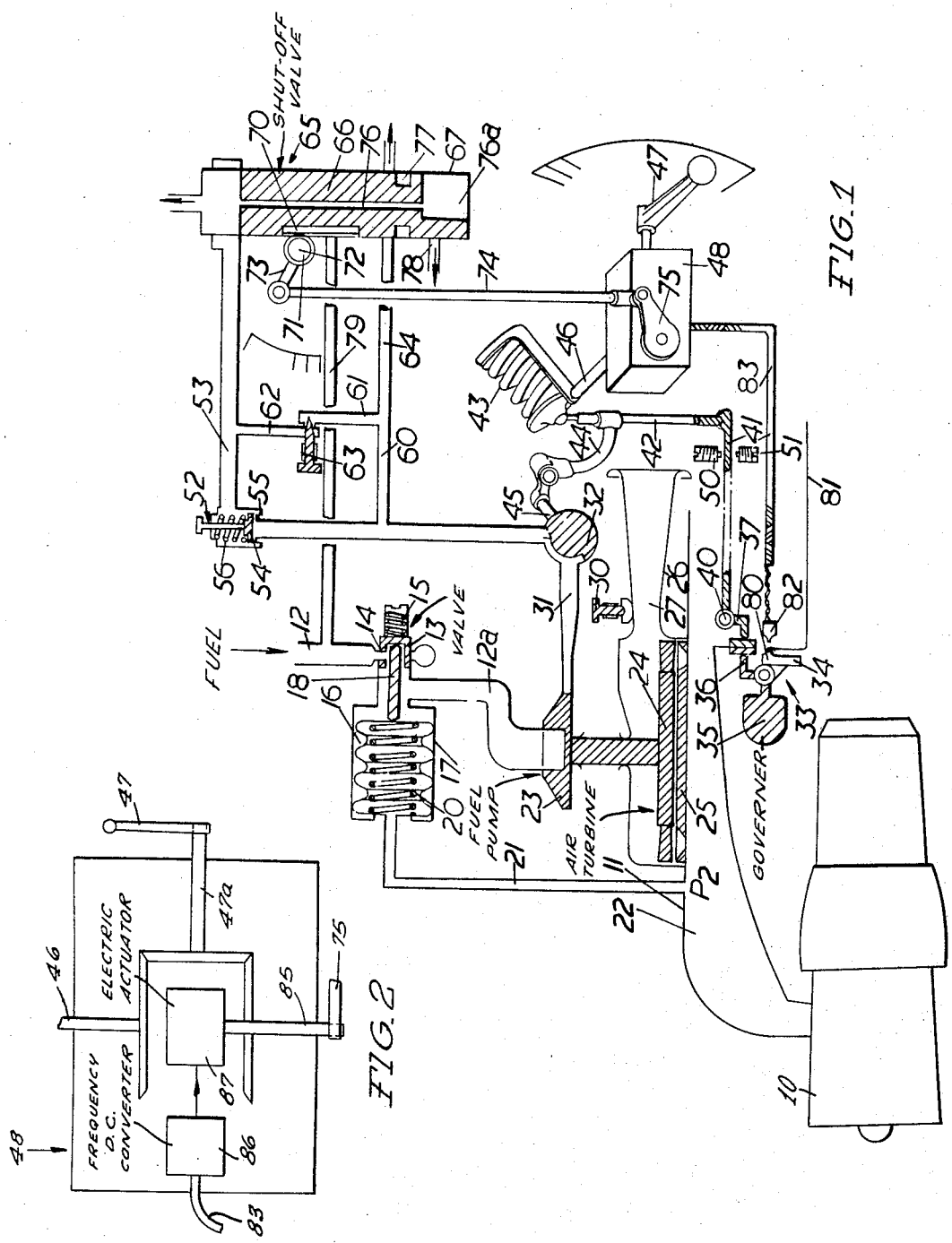

United States Patent Office 3,363,414
Patented Jan. 16, 1968

3,363,414
GAS TURBINE ENGINE FUEL SYSTEM
Christopher Linley Johnson, Allestree, Derby, England, assignor to Rolls-Royce Limited, Derby, England, a company of Great Britain
Filed Jan. 22, 1965, Ser. No. 427,284
Claims priority, application Great Britain, Feb. 4, 1964, 4,769/64
6 Claims. (Cl. 60—39.28)

This invention concerns a gas turbine engine fuel system.

According to the present invention, there is provided a gas turbine engine fuel system comprising a first fuel conduit, a centrifugal fuel pump, an air turbine driven by bleed air at a pressure functionally related to the delivery pressure of the engine compressor and which is drivingly connected to the fuel pump, the fuel pump supplying the first fuel conduit with fuel, a fuel inlet passage to the fuel pump, a second fuel conduit, a throttle valve disposed in said first fuel conduit, speed responsive means responsive to engine rotational speed, means for moving said throttle valve in a closing direction when the engine rotational speed exceeds a predetermined value, a pressurising valve by way of which the fuel which has passed said throttle valve passes to the second fuel conduit, a spring which urges the pressurising valve towards the closed position, a restricted by-pass passage which by-passes the pressurising valve and establishes restricted communication between the first and second fuel conduits.

Means may be provided for varying the extent to which the restricted by-pass passage restricts flow therethrough.

The means for supplying the first fuel conduit with fuel may comprise a fuel pump whose speed is controlled in accordance with a pressure prevailing in the engine compressor. Thus, the fuel pump may be driven by an air turbine which is itself driven by air bled from the engine compressor.

Air which has passed through the air turbine may flow through an air outlet venturi, means being provided for varying the throat area of the venturi.

Preferably the pump has a fuel inlet passage which contains a fuel inlet pressure regulating valve which is resiliently urged towards the closed position, a pressure responsive member being provided which is connected to the said regulating valve and which is subjected to compressor delivery air, the pressure responsive member effecting opening of the said regulating valve whenever the pressure of the compressor delivery air is above a predetermined value.

The said first fuel conduit may contain a throttle valve, there being speed responsive means, responsive to engine rotational speed, for moving said throttle valve in a closing direction when the engine rotational speed exceeds a selected value. The speed responsive means is preferably connected to the throttle valve by a linkage one part of which is acted upon by a spring which is adapted to subject said part to a force which resists closing movement of the throttle valve, and control means for effecting a desired degree of pivotal movement of said spring whereby to vary the value of said force.

The first fuel conduit preferably communicates with a feed pipe which is adapted to supply fuel to engine starting jets, a shut-off cock being provided which controls flow both through the said feed pipe and through the said second fuel conduit. Preferably, the said control means also controls movement of the shut-off cock.

An emergency governor is preferably provided which moves the shut-off cock into the closed position whenever the engine rotational speed exceeds a predetermined value. Thus, the emergency governor may comprise means for generating an electrical signal having a frequency whose value is related to engine rotational speed, and frequency responsive means for closing the shut-off cock whenever the frequency of the said signal exceeds a predetermined value.

The invention also comprises a gas turbine engine provided with a gas turbine engine fuel system as set forth above. Thus, the fuel system may be arranged to supply fuel to main combustion equipment (as opposed to reheat combustion equipment) of the engine.

The engine may be a vertical lift engine having a thrust to weight ratio of at least 8:1 and preferably of at least 12:1. Thus it may have a thrust to weight ratio of 16:1 or even more.

The invention is illustrated, merely by way of example, in the accompanying, purely diagrammatic drawings, in which:

FIGURE 1 is a part-sectional schematic view of a gas turbine engine fuel system according to the present invention, and FIGURE 2 is a schematic cross-section of the control box 48 of FIGURE 1.

In the drawing there is shown a gas turbine engine fuel system for supplying fuel to the main combustion equipment (as opposed to reheat combustion equipment) of a gas turbine engine 10 having compressor means, combustion equipment, turbine means and ducting 11 for bleeding compressor air. The engine 10 may be either a vertical lift engine (i.e. an engine adapted to produce vertical lift forces on an aircraft independently of those generated aerodynamically by forward flight of the aircraft) or a horizontally mounted forward propulsion engine.

A fuel inlet passage has portions 12, 12a which are adapted to be supplied with low pressure fuel from a tank (not shown) containing a backing pump (not shown). Between the portions 12, 12a of the fuel inlet passage there is disposed a cup-shaped fuel inlet pressure regulating valve 13 which has an aperture 14 in its curved wall. A spring 15 resiliently urges the regulating valve 13 towards the closed position.

A bellows 16, which is mounted within a chamber 17, is connected by a rod 18 to the regulating valve 13. A spring 20 is mounted in the interior of the bellows 16, the said interior being open by way of a pipe 21 to the pressure $P_2$ at the delivery end of a compressor 22 of the engine 10. The bellows 16 is arranged to open the regulating valve 13 whenever the pressure $P_2$ is above a predetermined value. Thus, it is ensured that the pressure in the portion 12a of the fuel inlet passage cannot exceed the pressure $P_2$.

The portion 12a of the fuel inlet passage communicates with the low pressure side of a centrifugal fuel pump 23, the latter being mounted on fuel lubricated carbon bearings (not shown). The fuel pump 23 is driven by an air turbine 24 of relatively large diameter (e.g. 4″), air which has been bled from the compressor 22 being directed through the air turbine 24 by way of a nozzle plate 25 which is bolted on to the engine casing 11.

Air which has passed through the air turbine 24 flows through an air outlet venturi 26. The venturi 26 is a sheet metal member of oval cross-section having a throat 27 whose cross-sectional area may be varied by a clamp screw 30. Thus, by turning the clamp screw 30, variation may be effected of the speed of the air turbine 24 and hence of the speed of the fuel pump 23.

The high pressure side of the fuel pump 23 communicates with a fuel conduit 31, flow through which is controlled by a rotary throttle valve 32.

Mounted within the engine 10 is a governor 33 comprising a rotary disc 34 which is driven by the engine. The rotary disc 34 is provide with pivotally mounted flyweights 35 each of which has an arm 36. The arms 36 contact an arm 37 which is connected at a pivot 40 to a lever 41. The lever 41 is secured to a rod 42 which is acted upon by a spring 43. The rod 42 is connected by a link 44 to a shaft 45 on which the rotary throttle valve 32 is mounted.

When the engine rotational speed increases, the fly-weights 35 will be moved outwardly under centrifugal force and this will cause the lever 41 to move in an anti-clockwise direction about the pivot 40. When therefore the engine rotational speed exceeds a selected value (the particular valve depending upon the force exerted by the spring 43), the fly-weights 35 will cause the throttle valve 32 to move in a valve closing direction.

The spring 43 is carried by a rotatable shaft 46. The latter may be rotated by a pilot's lever 47, via a control box 48, described in more detail below. Thus by moving the pilot's lever 47, the spring 43 may be moved pivotally so as to vary the value of the force which it exerts on the rod 42 in a direction resisting closing movement of the throttle valve 32.

An adjustable acceleration stop 50 and an adjustable deceleration stop 51 are provided on opposite sides of the lever 41 so as to limit movement thereof during acceleration and deceleration respectively.

The fuel conduit 31 communicates, by way of a pressurising valve 52, with a fuel conduit 53. The fuel conduit 53 is adapted to supply fuel to burners (not shown) of the engine 10.

The pressurising valve 52 has a valve member 54 which is adapted to cooperate with a valve seat 55, the valve member 54 being urged towards the valve seat 55 by a spring 56.

A by-pass passage having portions 60, 61, 62 by-passes the pressurising valve 52, the portion 60 of the by-pass passage communicating with the fuel conduit 31 and the portion 62 of the by-pass passage communicating with the fuel conduit 53.

Mounted in the by-pass passage is a variable restrictor member 63. Only restricted flow may therefore pass through the by-pass passage 60–62.

The portion 60 forms part of a feed pipe 64 which supplies fuel to engine starting jets (not shown).

A shut-off cock 65 has a valve member 66 which is movable in a bore 67. The valve member 66 has a rack 70 which meshes with a pinion 71. The pinion 71, which is rotatably mounted about an axis 72, has an arm 73 which is pivoted to a link 74. The link 74 is pivoted to a rotatable arm 75, rotation of the pilot's lever 47 effecting rotation not only of the shaft 46 but also of the arm 75 (and hence of the valve member 66).

The valve member 66, which has an axial passage 76 therethrough which communicates with a space 76a, is provided with an annular recess 77 which may be moved into and out of communication with the feed pipe 64.

The valve member 66 may be placed in a first, or closed, position (not shown) in which no fuel may flow through either the fuel conduit 53 or the feed pipe 64. In this position fuel from the said burners may pass to drain via the axial passage 76 and the space 76a which will at this time communicate with a drain passage 78.

The valve member 66 may, moreover, be moved successively from the said first position through a second position (not shown) in which fuel may flow through both the feed pipe 64 and the fuel conduit 53, and a third position (which is shown in the drawing) in which fuel may flow through the fuel conduit 53 only.

The pilot's lever 47 may accordingly be set in "stop" and "start" positions, which cause the valve member 66 to be placed in said first and second positions, and to a number of positions between "idle" and "maximum," which cause the valve member 66 to permit an increasing flow of fuel to pass through the fuel conduit 53.

Fuel which has leaked into the bore 67 of the shut-off cock 65 may pass back to the low pressure side of the fuel pump 23 by way of a passage 79.

The rotary disc 34 is provided on one face thereof with a plurality of angularly spaced apart projections 80, made of magnetic material. A permanent magnet 82 is surrounded by a coil (not shown) which is connected by leads 83 to the control box 48. When the engine rotates, the movement of the projections 80 past the permanent magnet 82 will effect the path of the magnet flux from the permanent magnet so that the magnetic flux through the coil varies. An electrical signal will thus pass to the control box 48, this signal having a frequency whose value is related to engine rotational speed. The control box 48 contains frequency responsive means (not shown) which cause the valve member 66 of the shut-off cock 65 to move to the closed position whenever the frequency of the said signal exceeds a predetermined value. This arrangement thus constitutes an emergency governor.

In operation, the speed of the air turbine 24, and hence of the fuel pump 23, (and consequently the fuel pressure in the fuel conduit 31), will depend upon the pressure of the air which has been bled from the compressor 22 to drive the air turbine 24. The pressure of this air will, however, depend both upon engine rotational speed and upon ambient conditions such as altitude and temperature.

If the density of the fuel flowing through the fuel pump 23 increases or decreases, this will cause the air turbine 24 to make the fuel pump 23 run respectively slower or faster so that the mass flow of fuel in the fuel conduit 31 remains substantially constant.

If, on the other hand, the fuel pump 23 were driven mechanically from the engine, the speed of the fuel pump 23 would not alter with density and the pressure in the fuel conduit 31 would fall substantially in proportion to the density of the fuel and the volume flow in the fuel conduit 31 would remain substantially constant.

The rate of the spring 56 of the pressurising valve 52 is such that, when the rotational speed of the air turbine 24 is below a first value, the pressure of the fuel in the fuel conduit 31 is insufficient to open the pressurising valve 52 and the fuel supply to the engine 10 is controlled by the quantity of fuel which can flow through the by-pass passage 60–62. As the rotational speed of the air turbine 24 increases from the said first value to a second value, the increasing pressure of the fuel effects increased opening of the pressurising valve 52 and hence an increased fuel supply to the engine 10. Finally, when the rotational speed of the air turbine 24 is above the said second value, the pressurising valve 52, is fully open. This control of the fuel supply to the engine 10 by the pressurising valve 52, which valve works at a substantially constant range of engine speeds, is thus "tailored" to the need to avoid over-fueling, and hence surging, of the engine 10.

FIGURE 2 illustrates, purely schematically, the construction of, and the connections within, the control box 48. As can be seen, the lever 47, shaft 46 and arm 75 are mechanically connected by bevel gearing. The arm 75 is mounted on a shaft 85 provided with a bevel gear meshing with a bevel gear on shaft 47a of lever 47.

The electrical leads 83 are connected to a conventional frequency-D.C. converter or a high pass filter 86 which controls an electric actuator 87. The actuator 87 is adapted to rotate the shaft 85 to effect rotation of arm 75 which in turn causes movement of valve member 66.

As illustrated, the actuator 87 is adapted to move not only the shaft 75 but also the throttle lever 47 and the shaft 46. In some applications, a free wheel device could be mounted between the shaft of the actuator 87 and its associated bevel gear to leave the shaft 47a unaffected by the actuator 87.

I claim:
1. A gas turbine engine fuel system comprising a first fuel conduit, a centrifugal fuel pump, an air turbine driven by bleed air at a pressure functionally related to the delivery pressure of the engine compressor and which is drivingly connected to the fuel pump, the fuel pump sup- plying the first fuel conduit with fuel, a fuel inlet passage to the fuel pump, a second fuel conduit, a throttle valve disposed in said first fuel conduit, speed responsive means responsive to engine rotational speed, means for moving said throttle valve in a closing direction when the engine rotational speed exceeds a predetermined value, a pressurising valve by way of which the fuel which has passed said throttle valve passes to the second fuel conduit, a spring which urges the pressurising valve towards the closed position, a restricted by-pass passage which by-passes the pressurising valve and establishes restricted communication between the first and second fuel conduits.

2. A gas turbine engine fuel system as claimed in claim 1 wherein there is provided a feed pipe which communicates with the first fuel conduit, a shut-off cock which controls flow both through the said feed pipe and through the said second fuel conduit, an emergency governor which moves the shut-off cock into the closed position whenever the engine rotational speed exceeds a predetermined value.

3. A gas turbine engine fuel system as claimed in claim 2 wherein the emergency governor comprises means for generating an electrical signal having a frequency whose value is related to engine rotational speed, and frequency responsive means for closing the shut-off cock whenever the frequency of the said signal exceeds a predetermined value.

4. A gas turbine engine fuel system as claimed in claim 2 further comprising an air outlet venturi which receives air which has passed through the air turbine, and means for varying the throat area of the air outlet venturi so as to vary the turbine speed and thus the fuel pump output.

5. A gas turbine vertical lift engine having a thrust to weight ratio of at least 8:1 comprising a first fuel conduit, a fuel pump, an air turbine which is driven by air bled from the engine compressor and which drives the fuel pump, an air outlet venturi which receives air which has passed through the air turbine, and means for varying the throat area of the air outlet venturi so as to vary the rotational speed of the turbine and hence the fuel pump outlet, the fuel pump supplying the first fuel conduit with fuel, a fuel inlet passage to the fuel pump, a second fuel conduit, a throttle valve disposed in said first fuel conduit, speed responsive means, responsive to engine rotational speed, means for moving said throttle valve in a closing direction when the engine rotational speed exceeds a predetermined value, a pressurising valve by way of which the fuel which has passed said throttle valve passes to the second fuel conduit, a spring which urges the pressurising valve towards the closed position, a restricted by-pass passage which by-passes the pressurising valve and establishes restricted communication between the first and second fuel conduits, a feed pipe which communicates with the first fuel conduit, a shut-off cock which controls flow both through the said feed pipe and through the second fuel conduit, an emergency governor which moves the shut-off cock into the closed position whenever the engine rotational speed exceeds a predetermined value, said emergency governor comprising means for generating an electrical signal having a frequency whose value is related to engine rotational speed, and frequency responsive means for closing the shut-off cock whenever the frequency of the said signal exceeds a predetermined value.

6. A gas turbine vertical lift engine having a thrust to weight ratio of at least 8:1 comprising a first fuel conduit, a fuel pump, an air turbine which is driven by air bled from the engine compressor and which drives the fuel pump, an air outlet venturi which receives air which has passed through the air turbine, and means for varying the throat area of the air outlet venturi so as to vary the rotational speed of the turbine and hence the fuel pump output, the fuel pump supplying the first fuel conduit with fuel, a fuel inlet passage to the fuel pump, a fuel inlet pressure regulating valve which is disposed in said fuel inlet passage and which is resiliently urged towards the closed position, a pressure responsive member which is connected to the said regulating valve and which is subjected to compressor delivery air, the pressure responsive member effecting opening of the said regulating valve whenever the pressure of the compressor delivery air is above a predetermined value, a second fuel conduit, a throttle valve disposed in said first fuel conduit, speed responsive means responsive to engine rotational speed, means for moving said throttle valve in a closing direction when the engine rotational speed exceeds a predetermined valve, a pressurizing valve by way of which the fuel which has passed said throttle valve passes to the second fuel conduit, a spring which urges the pressurizing valve towards the closed position, a restricted by-pass passage which by-passes the pressurising valve and establishes restricted communication between the first and second fuel conduits, a feed pipe which communicates with the first fuel conduit, a shut-off cock which controls flow both through the said feed pipe and through the said second fuel conduit, an emergency governor which moves the shut-off cock into the closed position whenever the engine rotational speed exceeds a predetermined value, said emergency governor comprising means for generating an electrical signal having a frequency whose value is related to engine rotational speed, and frequency responsive means for closing the shut-off cock whenever the frequency of the said signal exceeds a predetermined value.

References Cited
UNITED STATES PATENTS

| | | | |
|---|---|---|---|
| 2,612,944 | 10/1952 | Orr. | |
| 2,644,513 | 7/1953 | Mock | 60—29.28 X |
| 2,647,847 | 4/1954 | Davies et al. | 60—39.28 |
| 2,702,560 | 2/1955 | Bodier | 60—39.28 X |
| 2,742,755 | 4/1956 | Davies et al. | 60—39.28 X |
| 2,857,741 | 10/1958 | Evers | 60—39.16 |
| 2,871,659 | 2/1959 | Chamberlin et al. | 60—39.28 |
| 2,955,538 | 10/1960 | Haase | 60—39.28 X |
| 2,960,154 | 11/1960 | Campbell | 60—39.28 X |
| 2,988,883 | 6/1961 | Corbelt | 60—39.28 |
| 3,076,311 | 2/1963 | Johnson | 60—39.28 |

JULIUS E. WEST, *Primary Examiner.*